May 1, 1923. 1,453,740
E. L. BRENK
EXTERNALLY OPERABLE INCLOSED SAFETY TYPE SWITCH
Filed Jan. 17, 1921 2 Sheets-Sheet 1
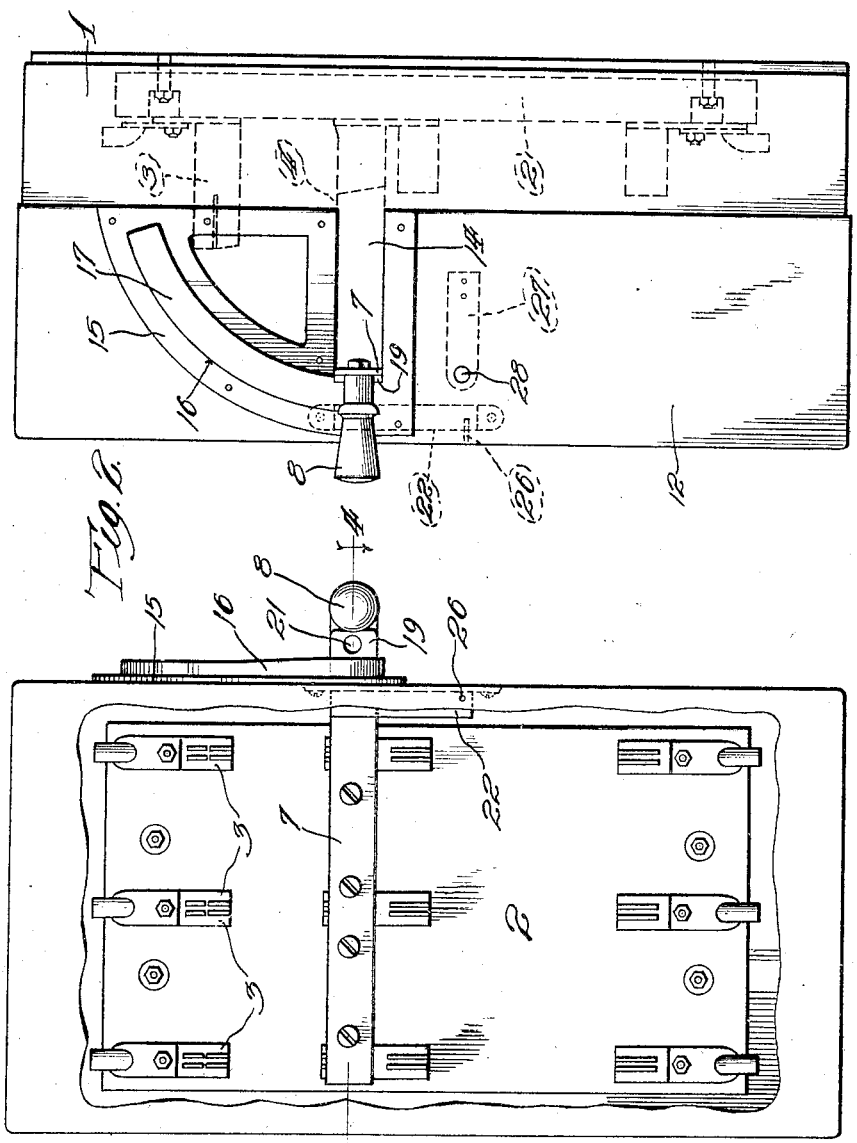
Witness:
Inventor:
Ernest L. Brenk,
by Chamberlin Freudenreich
Attys.

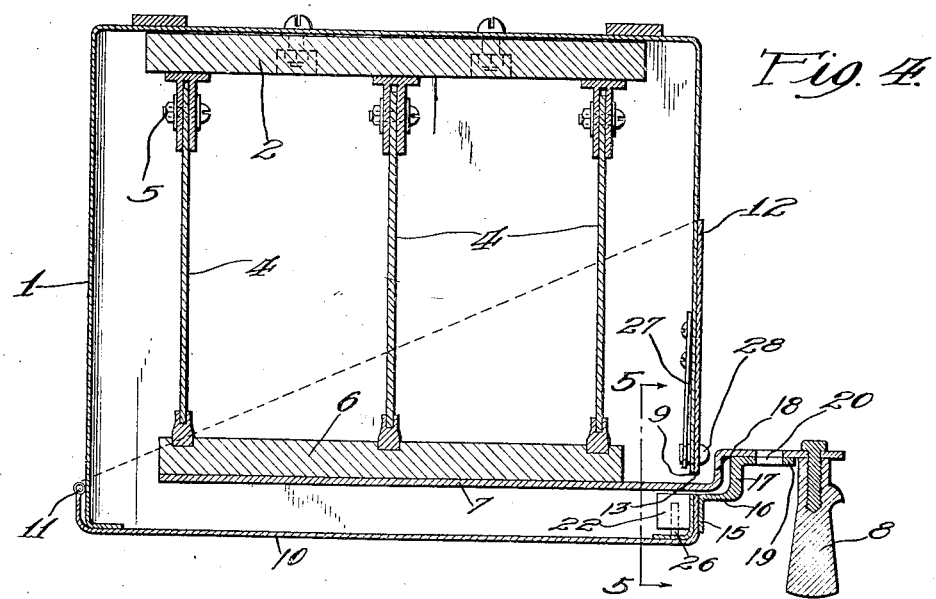
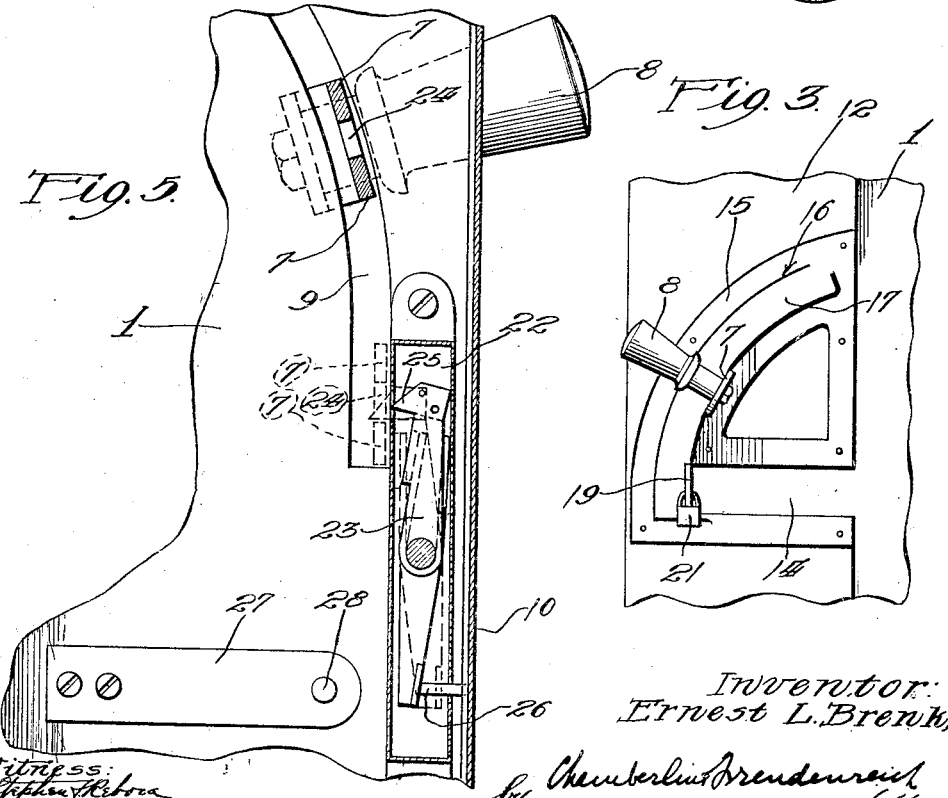

Patented May 1, 1923.

1,453,740

UNITED STATES PATENT OFFICE.

ERNEST L. BRENK, OF CICERO, ILLINOIS.

EXTERNALLY-OPERABLE INCLOSED SAFETY-TYPE SWITCH.

Application filed January 17, 1921. Serial No. 437,671.

*To all whom it may concern:*

Be it known that I, ERNEST L. BRENK, a citizen of the United States, residing at Cicero, county of Cook, State of Illinois, have invented a certain new and useful Improvement in Externally-Operable Inclosed Safety-Type Switches, and declare the following to be a full, clear, and exact description of the same, such as will enable others skilled in the art to which it pertains to make and use the same, reference being had to the accompanying drawings, which form a part of this specification.

The present invention has for its object to produce a simple and novel construction in which a service switch will be effectively inclosed, and which will permit the switch to be operated without opening the enclosure.

A further object of the present invention is to produce a simple and novel inclosed switch, provided with an operating handle external to the enclosing casing, and provided also with interlocks between the handle and the door or other movable element of the casing, whereby the casing cannot be opened except when the switch is open and whereby the switch cannot be closed in the usual way when the casing is open.

A further object of the present invention is to produce a simple and novel externally operable inclosed switch in which the switch handle serves as a lock for the enclosing casing except when the handle is in a predetermined open position, a lock being provided for preventing the handle from being brought into this predetermined position or, if desired, locking the handle and the casing together when the handle is in such predetermined position.

A further object of the present invention is to produce a simple and novel externally operable inclosed switch in which the enclosing casing cannot be opened when the switch is closed and the switch cannot be closed in the usual way when the casing is open, although it may be closed by one deliberately performing a certain operation or manipulation.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of a switch arranged in accordance with a preferred form of my invention, the larger part of the door being broken away;

Fig. 2 is a side elevation of the switch, viewed from the side on which the operating handle lies;

Fig. 3 is a view similar to Fig. 2, showing only a fragment of the switch, and the handle being in a different position from that shown in Fig. 2;

Fig. 4 is a section, on a somewhat larger scale, on line 4—4 of Fig. 1; and

Fig. 5 is a section on a still larger scale, taken approximately on line 5—5 of Fig. 4.

Referring to the drawing, 1 represents a box of fire-proof material, preferably metal, which will usually be rectangular in shape but may of course take other forms.

In the box is a suitable slab, 2, of insulating material carrying co-operating stationary and movable contacts. In the arrangement shown, the stationary contacts are indicated at 3 while the movable contacts are in the form of blades or flat bars, 4, each hinged at its inner end to the supporting slab as indicated at 5; the outer ends being connected together by a cross-piece, 6, of insulating material. The switch handle consists of a bar or plate, 7, fixed to the member 6 and projecting laterally beyond one end of the latter to the outside of the casing, where it is provided with a suitable hand-piece or grip, 8. The side wall of the casing is provided with a long narrow arc-shaped slot, 9, through which the member 7 of the switch handle projects; this slot, in the arrangement shown, permitting the handle to be swung through an angle of approximately ninety degrees or from a position in which the switch blades lie parallel with the insulating slab to a position in which they extend at right angles to the latter.

The front of the casing is open but is adapted to be closed by a door, 10, which is hinged as at 11 on the side of the casing opposite to that containing the slot through which the switch handle passes. The door extends across the entire front of the casing and, along its free edge opposite the hinge, is provided with a deep flange, 12, which, when the door is closed, lies against the outer face of the side of the casing containing the slot through which the switch handle passes. The part 12 of the door must of course be provided with a slot, 13, registering with the slot 9 in the casing when the door is closed; and it must also be provided with a slot, 14, extending from one end of the slot 13 outwardly through the edge of the flange 12, for the purpose of permitting the flange to pass the switch handle when the door is closed. It will thus be seen that the door cannot be closed unless the switch handle is in a predetermined position, namely an open position which brings it opposite the slot, 14, in the door, as illustrated in Figs. 1 and 2. With the handle standing in the position illustrated in Figs. 3 and 5, for example, assuming the door to be open, the door could not be closed because the edge of the flange 12 would strike against the handle.

It is desirable that the slot in the door be closed in such a way as not to leave a direct passage into the casing when the door is closed. To this end I have secured upon the flange 12 a suitable plate or casting, 15, having a shallow wall, 16, extending along what may be termed the front edge of the curved slot in the door at right angles to the plane of the flange 12, this wall having a flange, 17, overlying the slot and arranged parallel with but spaced apart from the flange 12 of the door. The member 7 of the handle, after passing through the slot in the side of the casing is therfore bent rearwardly, as indicated at 18, and then laterally so as to be in position to clear the flange 17 when the door is in its closed position. With this arrangement, the member 7 acts in two ways to lock the door. The locking may be, first, between the straight portion of the bar 7 and the slot 13 or, second, between the outer face of the flange 12 and the bend, 18, in the handle; the movement of the flange 12, upon the opening of the door, being forwardly and at the same time laterally away from the side of the casing and therefore causing this flange to strike against the bend, 18, in the handle if it be attempted to open the door while the handle is in any position except that in which it registers with the slot 14.

The member 15 may be provided with an ear, 19, having a hole, 20, adapted to register with a similar hole in the member 7 of the switch handle when the switch is in its fully opened position. A suitable padlock, such as indicated at 21 in Fig. 3, may be inserted through these registering openings so as to lock the switch open and the switch casing closed. If desired, the lock may be fastened to the ear, 19, alone, as shown in Fig. 3 so as to prevent the switch arm from being swung into the door-releasing position; this being the normal condition when the switch is in use, permitting the switch to be opened and closed at will but preventing the casing from being opened until the lock is removed.

It is desirable to provide means for preventing the closing of the switch while the casing is open. To this end I have placed within the casing in the vicinity of the forward end of the slot, 9, through which the switch handle passes, a suitable lock device which may conveniently consist of a small protective casing, 22, in which is arranged a spring-held dog, 23. The member 7 of the switch handle is provided with a hole, 24, in position to be engaged by a nose, 25, on the dog 23 when the switch is fully open. On the door of the casing is a pin, 26, which engages with the dog when the door is closed and holds it in a retracted position as shown in full lines in Fig. 5, the nose being withdrawn into the casing 22 so as to be out of the path of movement of the member 7 of the switch handle. Consequently, when the door is closed, the switch handle may be swung up and down freely. As soon as the door is opened, the dog shifts automatically from the full line position in Fig. 5 to the dotted line position, namely into interlocking engagement with the switch handle. Thereafter the switch cannot be closed until the handle is released from the dog; this being normally accomplished by the closing of the door. In case a repair man desires to operate the switch while the door is open, he may use a nail or other small instrument to retract the dog in the same manner that this is ordinarily done by the pin on the door when the door is closed. However, this requires a deliberate intentional manipulation different from the ordinary operations or manipulations in simply closing or in operating the switch, so that there is no danger that the switch handle will be released while the casing is open, unless it be the deliberate intention of some one temporarily to neutralize the effect of the safety catch.

If desired, a suitable catch may be provided for holding the door closed. In the arrangement shown, a leaf spring 27, is fastened at one end to the inside of the casing. At the free end of the spring is a button or pin, 28, adapted to extend outwardly through registering holes in the side wall of the casing and the overlapping flange of the door when the door is closed, the whole constituting a spring catch.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A casing open on one side, a door extending across said open side, said door being hinged at one edge to the casing and having at the other edge a wide flange extending inwardly at right angles thereto and lying in proximity to one of the side walls of the casing when the door is closed, a switch device in said casing, said flange and said side wall of the casing having registering arc-shaped slots therethrough, an operating handle for said switch device projecting through said slots, and said flange having a second slot extending from one end of the arc-shaped slot therein outwardly through one edge of the flange and possessing a width sufficient to permit the opening and closing of the door when said handle is brought into registration therewith.

2. A casing open on one side, a door extending across said open side, said door being hinged at one edge to the casing and having at the other edge a wide flange extending inwardly at right angles thereto and lying in proximity to one of the side walls of the casing when the door is closed, a switch device in said casing, said flange and said side wall of the casing having registering arc-shaped slots therethrough, an operating handle for said switch device projecting through said slots, and said flange having a second slot extending from one end of the arc-shaped slot therein outwardly through one edge of the flange and possessing a width sufficient to permit the opening and closing of the door when said handle is brought into registration therewith, a cover for the slot in the flange fixed to the flange and comprising a shallow arc-shaped wall extending along one edge of the slot and a plate or rim extending from said wall across the slot and parallel with said flange, said handle being bent after passing through the slot so as to lie parallel with said plate or rim and then outwardly from the same underneath the free edge of said plate or rim.

In testimony whereof, I sign this specification.

ERNEST L. BRENK.